United States Patent
Sekhar et al.

(10) Patent No.: US 7,059,400 B2
(45) Date of Patent: *Jun. 13, 2006

(54) DUAL-COMPARTMENT VENTILATION AND AIR-CONDITIONING SYSTEM HAVING A SHARED HEATING COIL

(75) Inventors: Chandra Sekhar, Singapore (SG); Kwok Wai Tham, Singapore (SG); David Kok Wai Cheong, Singapore (SG); Nyuk Hien Wong, Singapore (SG)

(73) Assignee: National University of Signapore, Signapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 10/860,391

(22) Filed: Jun. 3, 2004

(65) Prior Publication Data

US 2005/0028970 A1    Feb. 10, 2005

Related U.S. Application Data

(63) Continuation-in-part of application No. 10/306,733, filed on Nov. 29, 2002.

(60) Provisional application No. 60/334,062, filed on Nov. 30, 2001.

(51) Int. Cl.
*F28D 1/04*    (2006.01)

(52) U.S. Cl. ........................ 165/205; 165/249
(58) Field of Classification Search ................ 165/213, 165/214, 252, 248; 454/229, 233.2
See application file for complete search history.

(56) References Cited

U.S. PATENT DOCUMENTS

| | | | | | |
|---|---|---|---|---|---|
| 3,810,327 | A | * | 5/1974 | Giansante | 165/248 |
| 3,915,376 | A | * | 10/1975 | Attridge et al. | 165/248 |
| 4,210,278 | A | * | 7/1980 | Obler | 236/49.3 |
| 4,283,007 | A | * | 8/1981 | Bramow et al. | 165/222 |
| 4,467,706 | A | * | 8/1984 | Batcheller et al. | 165/244 |
| 4,663,725 | A | * | 5/1987 | Truckenbrod et al. | 165/255 |
| 4,841,733 | A | * | 6/1989 | Dussault et al. | 165/223 |
| 4,876,858 | A | * | 10/1989 | Shaw et al. | 62/93 |
| 5,080,282 | A | * | 1/1992 | Harmon | 454/229 |
| 5,259,553 | A | * | 11/1993 | Shyu | 165/248 |
| 6,076,739 | A | * | 6/2000 | Littleford et al. | 165/222 |
| 6,398,118 | B1 | * | 6/2002 | Rosen et al. | 165/248 |
| 6,604,688 | B1 | * | 8/2003 | Ganesh et al. | 165/249 |
| 2003/0042012 | A1 | * | 3/2003 | Pearson | 165/210 |

FOREIGN PATENT DOCUMENTS

| | | | |
|---|---|---|---|
| DE | 3815730 | * | 11/1988 |
| JP | 60-155840 | * | 8/1985 |
| JP | 63-80149 | * | 4/1988 |
| JP | 1-260236 | * | 10/1989 |

* cited by examiner

*Primary Examiner*—Teresa J. Walberg
(74) *Attorney, Agent, or Firm*—Dinsmore & Shohl LLP

(57) ABSTRACT

An HVAC system has two variable-air-volume (VAV) systems, a first VAV system for moving fresh air and a second VAV system for moving recycled air. Both the fresh air and recycled air are cooled and dehumidified by a single heat-exchanging coil. The fresh and recycled air streams travel independently in separate ducts until the air streams reach a remotely located mixing box where the air streams mix and ventilate into a room or zone of a building. The HVAC system uses carbon dioxide and temperature sensors in order to regulate the flow of fresh and recycled air to various mixing boxes throughout the building.

47 Claims, 7 Drawing Sheets

DUAL-COMPARTMENT VENTILATION AND AIR-CONDITIONING SYSTEM HAVING A SHARED HEATING COIL

RELATED APPLICATIONS

This application is a continuation-in-part of U.S. patent application Ser. No. 10/306,733 filed Nov. 29, 2002, and entitled "Single-Coil Twin-Fan Variable-Air-Volume (VAV) System For Energy-Efficient Conditioning of Independent Fresh and Return Air Streams," which is incorporated herein by reference, which claims benefits from U.S. Provisional Patent Application No. 60/334,062 filed Nov. 30, 2001.

FIELD OF THE INVENTION

This invention relates to heating, ventilation and air conditioning (HVAC) and, more particularly, to energy-efficient ventilation and air conditioning systems.

BACKGROUND OF THE INVENTION

Air-conditioning, especially in tropical climates, is dictated by the stringent requirements of cooling and dehumidification. The HVAC engineer must seek an optimal design, balancing energy consumption and cost, thermal comfort, and indoor air quality (IAQ), the latter criterion being a function of how well the building is ventilated. Although health and thermal comfort issues can be usually addressed by attempting to eliminate the various sources of indoor pollutants, it is almost impossible to totally eliminate them. It is thus inevitable that ventilation with fresh air should play an important role in the eventual quality of the air in the indoor environment. The high energy-penalty of cooling and dehumidification associated with ventilation in the tropical context is apparent from the large enthalpy difference that exists between the outside air and the indoor air conditions.

Inadequate ventilation almost invariably leads to a deterioration of the indoor air quality due to a build-up of indoor pollutants such as carbon dioxide. Adequate ventilation with poor dehumidifying performance of the cooling coil would be even worse as it is likely to result in elevated humidity levels in the air distribution systems and the occupied zones. This phenomenon could be considered in the context of humidity as an "indoor" pollutant, which propagates the origin and sustenance of microbial contamination. The issue of high indoor humidity levels in tropical buildings originates, from the high ambient humidity levels in the ventilation air (fresh air) and the need to provide adequate ventilation to avoid "Sick Building Syndrome".

The basic requirements of any air-conditioning system are to provide comfortable temperature and humidity conditions for the occupants of a building. In a steady-state environment, this is a relatively simple task. However, in a dynamic indoor environment, where cooling and dehumidifying requirements fluctuate with changes in weather and occupancy, designing an energy-efficient air-conditioning is anything but a simple task. Optimizing the design of an air-conditioning system is an even more arduous task in hot and humid climates, where the fresh air contains extremely high humidity levels at all times of the year.

In typical cooling and dehumidifying coil designs, an air stream having an intake temperature and humidity flows over the tubes and fins of a coil while chilled water flows through the tubes of the coil. The chilled water enters the coil at a supply temperature and leaves at a return temperature. The psychrometric performance of the cooling coil determines the cooling and dehumidifying of the air flowing past the coil. In the event of two different air streams being conditioned, two separate coils would typically be employed with either a parallel or a sequential feed of chilled water.

Efforts have been directed in the past to achieve energy-efficient dehumidifying performance by addressing the air velocity across the coil, the chilled water velocity through the tubes of the coil and various configurations of the physical geometry of the coil. These designs are exemplified by, for instance, the following patents: U.S. Pat. No. 4,876,858 (Shaw), EP00415747A2 (Shaw), U.S. Pat. No. 5,461,877 (Luminis), KR09302466B1 (Luminis) and WO09220973A1 (Luminis). Some recent enhancements are aimed at collecting the water from the first coil in a manifold and then feeding this water (at the temperature of the chilled water return of the first coil) in a sequential mode to the tubes of the second coil. In essence, this still amounts to two different heat-exchanging coils both on the air side as well as the chilled water side.

However, certain drawbacks are evident from this two-coil design. The primary drawback is that two-coil systems are not very energy-efficient. Secondly, two-coil systems are costly to build, as they require more components. Thirdly, twin-coil systems occupy more space in a building, thus diminishing the usable floor space in building layouts.

Thus, there is a need in the art for an improved ventilation and air conditioning system that overcomes the foregoing deficiencies.

SUMMARY OF THE INVENTION

In accordance with an aspect of the present invention, a ventilation and air-conditioning system includes, a housing having first and second compartments in parallel arrangement, each one of said first and second compartments having an inlet and an outlet allowing a air to flow therethrough; and a heat exchanger shared between said first and second compartments. The heat exchanger has first and second portions. The first portion is for exchanging heat with air in said first compartment. The second portion is for exchanging heat with air in said second compartment. The heat exchanger having an internal fluid path for a heat exchange fluid, said fluid path crossing between said first and second portions.

As embodied and broadly described herein, a further aspect of the present invention provides a ventilation and air-conditioning system for energy-efficient conditioning of independent fresh and recycled air streams, said system comprising a first intake for drawing in a volume of fresh air; a second intake for drawing in a volume of recycled air; a single-coil heat exchanger for conditioning both the volume of fresh air and the volume of recycled air, thereby producing a supply of conditioned fresh air and a supply of conditioned recycled air; a first fan for moving said supply of conditioned fresh air downstream in a first duct; a second fan for moving said supply of conditioned recycled air downstream in a second duct; a mixing box connected downstream to said first duct and said second duct, said mixing box being an enclosure in which said supply of conditioned fresh air and said supply of conditioned recycled air may mix prior to being ventilated into a room or zone; and a control system for sensing a zonal tempera ture and a zonal ventilation requirement and for regulating said supply of conditioned fresh air in accordance with said zonal ventilation requirement and for regulating said supply of conditioned recycled air in accordance with said zonal temperature.

Advantageously, a single coil enables the simultaneous conditioning of two separate air streams without mixing in the downstream section of the coil. By treating the fresh and return air streams separately (using separate fans which are independently and separately controlled), the system achieves optimal dehumidifying performance on the fresh air stream (which is predominantly latent cooling in the tropics) and optimal sensible cooling performance on the recycled air stream (which is predominantly sensible cooling). Another key advantage is the ability to achieve the desired cooling and dehumidifying performance in a rather independent manner using a single coil, both on the air and the chilled water sides. A single coil can be installed in a single air-handling unit (AHU) with suitable modifications, which essentially involves installing a thermally insulated sheet-metal barrier to distinctly separate the fresh and the return air streams. By using a single coil with a single chilled water feed, there is no longer any need for intermediate return and supply manifolds between the first (fresh air) and the second (return air) coils. Consequently, the single-coil twin-fan system not only occupies less floor area but it also costs less to build, install and operate.

In other words, a single-coil twin-fan system cools and dehumidifies two separate air streams. Preferably, the fresh and return air streams are moved by variable-air-volume systems (one for each air stream). The fresh air and recycled air travel in separate ducts but through a single, common coil that cools and dehumidifies both air streams. The fresh air stream and the recycled air stream do not mix when the two streams flow through the coil. The fresh air and recycled air only mix downstream at a mixing box just prior to being ventilated into the room or zone to be cooled. This diminishes humidity levels in the occupied zones of a building in direct response to occupant density. Occupant density alone governs the dehumidifying performance of the system in a distinct manner and all other thermal loads govern the cooling performance of the system separately.

This new air conditioning system is capable of distributing two streams of air (one stream of conditioned fresh air and the other stream of conditioned recycled air) to various mixing boxes located throughout a building. By feedback signals, energy-efficiency may be optimizes by tailoring the ventilation and cooling requirements in various zones of a building. This system thus provides enhanced indoor air quality (IAQ) with improved energy efficiency.

Advantageously, the single feedback of coolant (e.g. chilled water) allows relative ease of operation of the coil. The dynamic psychrometric performance of the coil is achieved by modulating the rate of coolant flow as a function of changing cooling and ventilation requirements.

Other objects and features of the invention will become apparent by reference to the following description and the drawings.

BRIEF DESCRIPTION OF THE DRAWINGS

The invention is further described, by way of example only, with reference to the accompanying drawings wherein.

Figure 1:
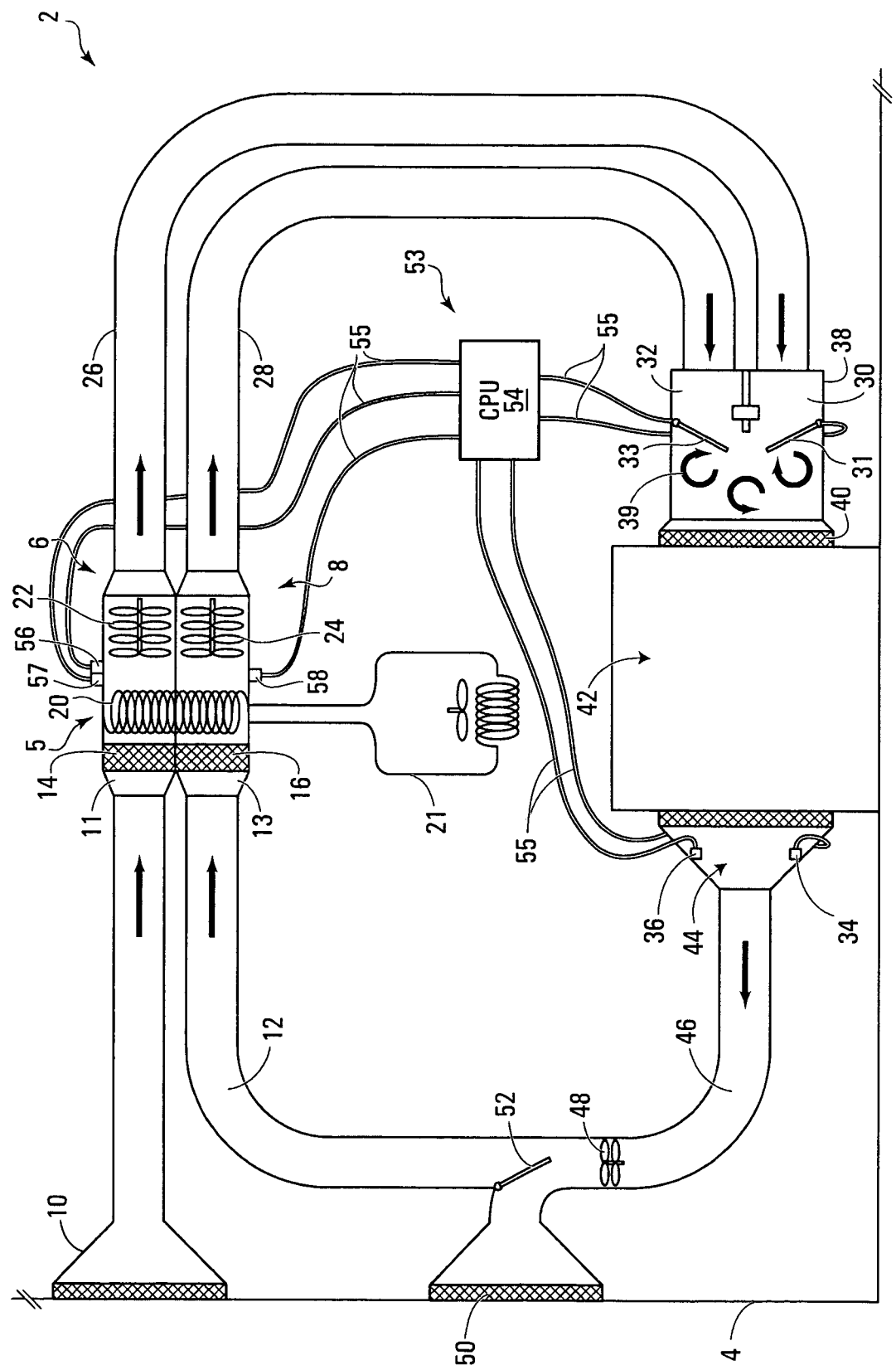
FIG. 1 is a schematic depicting an energy-efficient single-coil twin-fan HVAC system in accordance with the present invention.

In the drawings, preferred embodiments of the invention are illustrated by way of examples. It is to be expressly understood that the description and drawings are only for the purpose of illustration and are an aid for understanding. They are not intended to be a definition of the limits of the invention.

DESCRIPTION OF EXEMPLARY EMBODIMENTS

Referring to FIG. 1, an HVAC system denoted generally by the reference numeral 2 for ventilating and conditioning the air in a building 4 has an air-handling unit (AHU) 5 which comprises two separate variable-air-volume (VAV) systems 6, 8. The first VAV system 6 draws in fresh air from outside through a fresh air intake 10. The fresh air intake 10 has a diffuser 11 which expands and slows the fresh air for maximal heat transfer. The fresh air is first filtered through a fresh air filter 14 and then cooled and dehumidified by a coil 20. The coil 20 is a heat-exchanging coil with a single feed of chilled water. A fresh air fan 22 moves the conditioned fresh air downstream through a fresh air duct 26 to a fresh air VAV box 30. The fresh air VAV box 30 is connected to a mixing box 38 into which the fresh air may flow. A fresh air damper 31 regulates the flow of conditioned fresh air into a mixing chamber 39 which is a portion of the mixing box 38.

The second VAV system 8 draws recycled air from inside the building through a recycled air intake 12. The recycled air intake 12 has a diffuser 13 to expand and slow the recycled air for maximal heat transfer. The recycled air is first filtered through a recycled air filter 16 and then cooled and dehumidified by said coil 20. The coil 20 is the same heat-exchanging coil that cools the fresh air, even though the fresh air and recycled air travel in separate ducts. A recycled air fan 24 moves the conditioned recycled air downstream through a recycled air duct 28 to a recycled air VAV box 32. The recycled air VAV box 32 is connected to the mixing box 38 into which the recycled air may flow. A recycled air damper 33 regulates the flow of conditioned recycled air into the mixing chamber 39 of the mixing box 38.

A feedback control system, which is managed by a central processing unit (CPU) 54, controls the operation of the HVAC system 2. The CPU 54 computes optimal fan speeds and damper openings based on temperature and carbon dioxide ($CO_2$) readings from sensors located at various places in the building 4.

Referring to FIG. 1, a $CO_2$ sensor 34 is provided for measuring the carbon dioxide concentration in the air. The $CO_2$ sensor is located in a return air duct 46 near a return vent 44. The return air duct 46 also contains a temperature sensor 36 for measuring the air temperature leaving the room. The carbon dioxide sensor 34 and the temperature sensor 36 are linked via wires 55 (or cables) to the central processing unit (CPU) 54 of the control system. The CPU 54 computes the optimal damper openings for the fresh air damper 31 and the recycled air damper 33 so that the optimal mixture of fresh and recycled air flows into a mixing chamber 39 in the mixing box 38. The CPU 54 also regulates the fan velocity of each VAV system to vary the overall cooling and ventilation in accordance with total building demand. The CPU 54 controls the first VAV system 6 and the second VAV system 8.

The AHU 5 comprises a fresh air temperature sensor 56 located between the coil 20 and the fresh air fan 22, that measures the "off-coil" temperature of the fresh air stream. The AHU 5 also comprises a recycled air temperature sensor 58 located between the coil 20 and the recycled air fan 24, that measures the "off-coil" temperature of the recycled air stream. A fresh air humidity sensor 57 is also located in the AHU 5 between the coil 20 and the fresh air fan 22. There are mainly two control modes for the system. In normal operating conditions (i.e. when humidity is within acceptable limits), the CPU 54 uses the temperature signal from the recycled air temperature sensor to control the coolant circuit 21. When the humidity level of the fresh air downstream of the coil exceeds the acceptable limit, the CPU 54 uses the temperature signal from the fresh air temperature sensor to control the flow rate of the coolant in the coolant circuit 21. As long as the humidity downstream of the heat exchanger 20 is within acceptable set-point limits, the temperature of the recycled air downstream of the heat exchanger 20 will predominate in the control.

Referring still to FIG. 1, conditioned fresh air and conditioned recycled air are mixed in the mixing box 38 in accordance with the local cooling and ventilation requirements. The mixing box 38 preferably functions as a plenum chamber. A plenum chamber is an enclosed space in which the air pressure is greater than that in the outside atmosphere. Air is thus forced into the mixing box 38 (plenum chamber) for slow distribution through a localized diffuser vent 40.

As noted above, the mixed air is vented through a diffuser vent 40 into a room 42 (or office or building zone). The room 42 also has the return vent 44, which draws room air into the return air duct 46. A return fan 48 is provided to assist the return flow of the recycled air back to the second VAV system 8. The return air duct 46 bifurcates into an exhaust vent 50 and the recycled air intake 12. A controllable damper 52 is located at the bifurcation of the return air duct 46. The damper 52 can be controlled to divert a variable amount of recycled air back to the second VAV system 8, i.e., into the recycled air intake 12. The CPU 54 controls the damper 52 to alleviate air pressure build-up when large volumes of fresh air are ventilated into the system.

Figure 2:
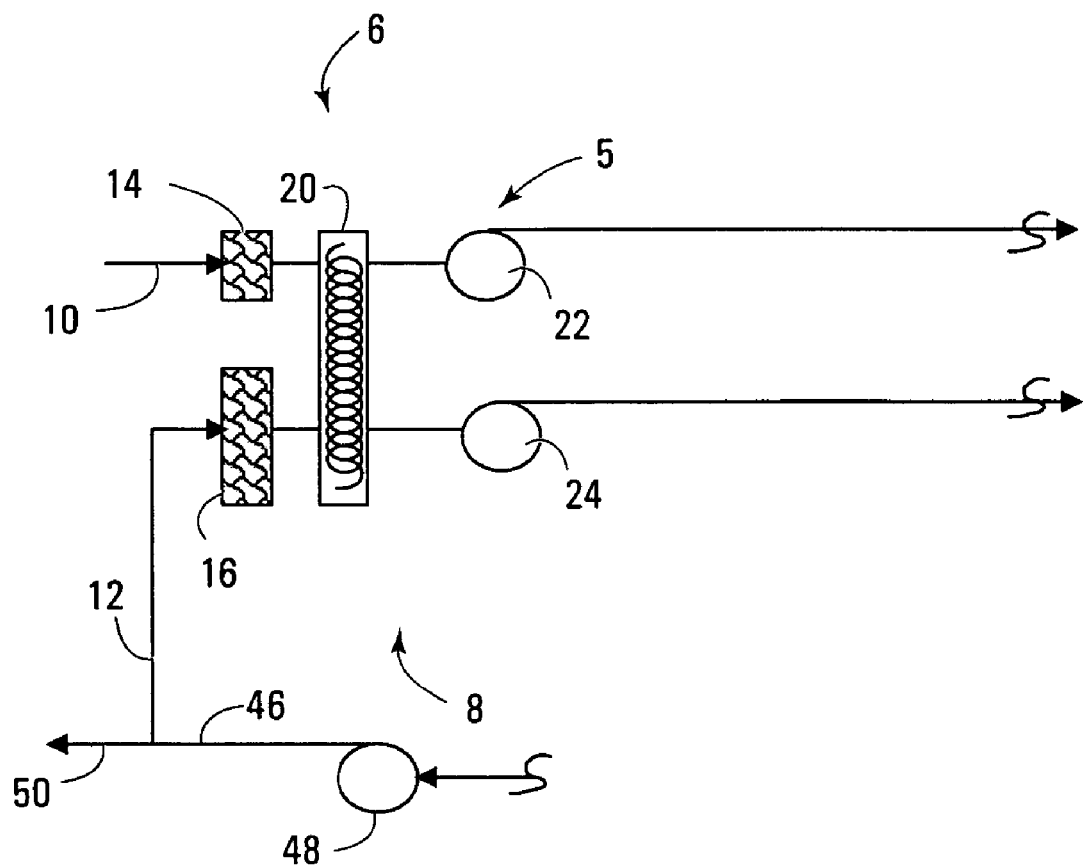
FIG. 2 is a simplified schematic of the system depicted in FIG. 1.
Figure 3:
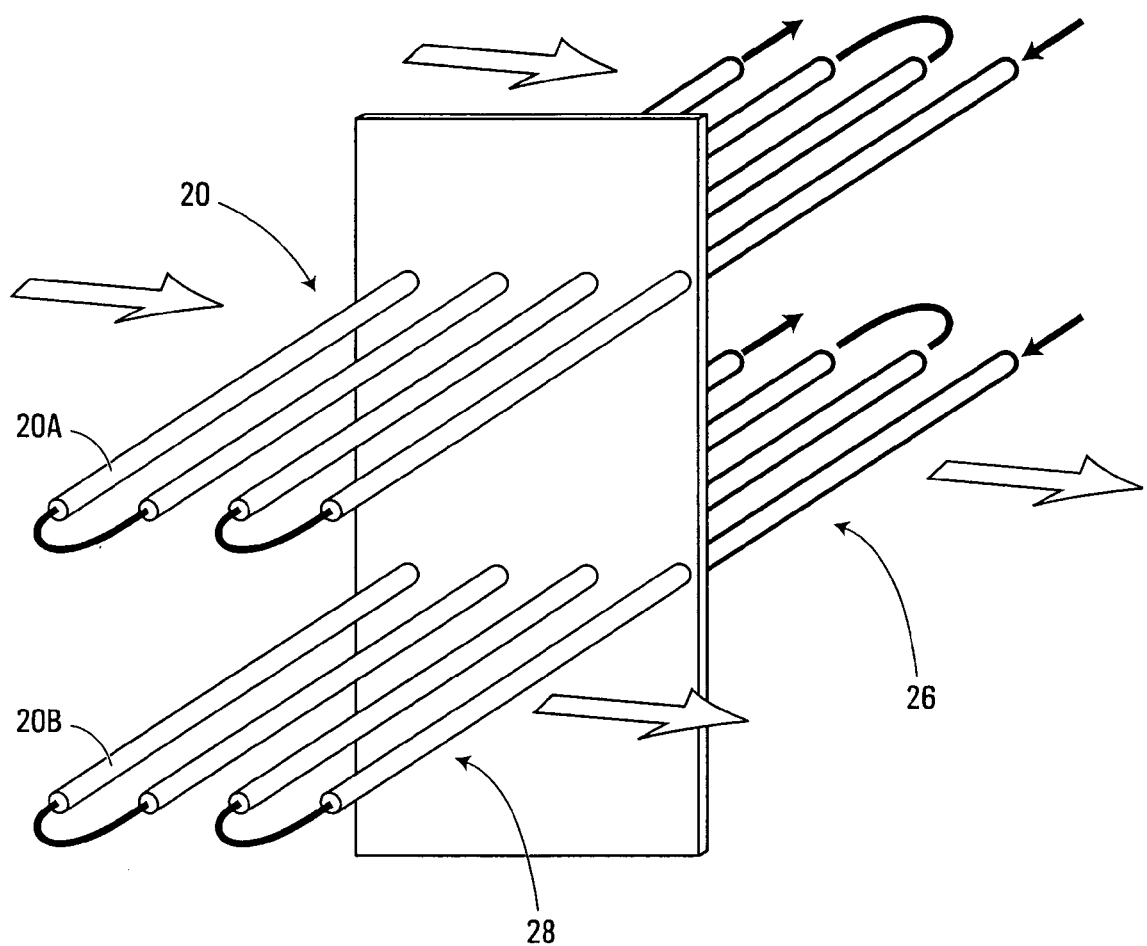
FIG. 3 is an isometric view of the heat-exchanging coil of the system depicted in FIG. 1.

As depicted by the simplified schematic in FIG. 2, the HVAC system 2 has two variable-air-volume (VAV) systems which share the single, common coil 20 for cooling and dehumidifying both the fresh air stream and the recycled air stream. In other words, the fresh air is filtered, conditioned and moved downstream by the first VAV system 6 whereas the recycled air is filtered, conditioned and moved downstream by the second VAV system 8. However, the first and second VAV systems 6, 8 share the same cooling and dehumidifying coil 20. Each pass of chilled water through the tubes of the coil serves both the fresh air stream and the return air stream. The circuiting of the tubes is done in such a way so as to ensure as much of a counter-flow arrangement as possible, which is illustrated in FIG. 3. Also shown in FIG. 3 are two coil sub-circuits 20a and 20b. It is important to note that these form part of the single, integrated coil 20. They are arranged into sub-circuits 20a, 20b in order to optimize counter-flow heat transfer. A thermally insulated sheet metal barrier (a "common wall") 27 separates the fresh air stream from the recycled air stream. The barrier, or common wall, 27 should be suitably modified to interface with one of the plate fins of the heat exchanger to ensure that the air streams remain independent and unmixed as they flow through the heat exchanger 20.

Alternative circuiting arrangements are, of course, possible. FIG. 3 is a schematic diagram of what takes place in the single coil of the system. It illustrates a full-circuiting arrangement (with four passes, for example). A half-circuiting or one-third-circuiting arrangement could also be used. In all of the circuiting arrangements, there is but one, single coil 20 for cooling and dehumidifying both the fresh air and the recycled air. The optimal dehumidifying performance of the single-coil is achieved by the fact that there exists a high driving potential for dehumidification between the high humid conditions of the fresh air in the tropics and the cold surface of the coil. The leaving condition of the fresh after passing through the coil will be typically fully saturated.

Figure 4:
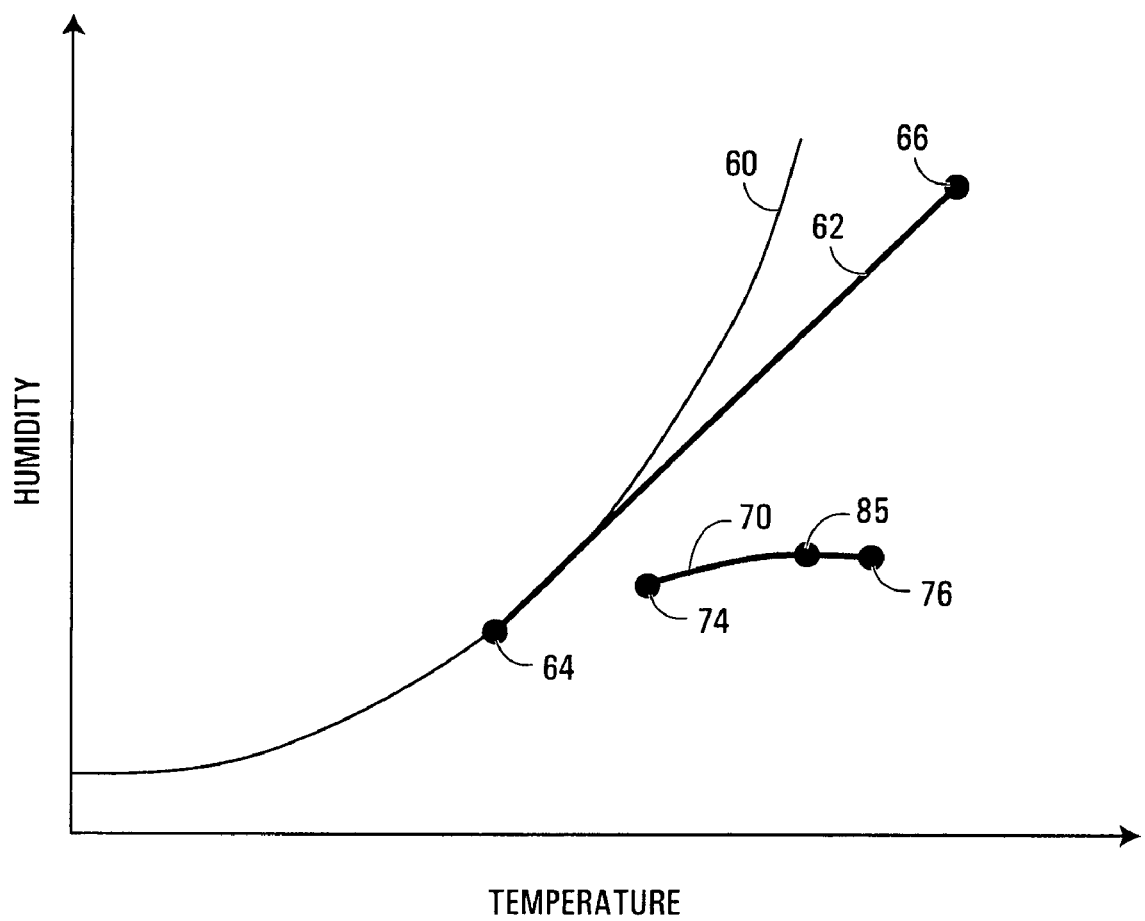
FIG. 4 is a psychrometric chart showing graphically the superior dehumidifying performance of the system depicted in FIG. 1.

FIG. 4 illustrates the psychrometric performance of the single-coil twin-fan HVAC system 2. (A psychrometric chart shows the humidity of air as a function of temperature.) In order to ensure proper cooling and ventilation, the psychometric performance of the coil is controlled based on readings from the "off-coil" temperature of each air stream. The two "off-coil" temperatures play a crucial role in controlling the dynamic psychrometric performance of the coil to ensure acceptable thermal comfort and indoor air quality (IAQ) in the occupied zones. The chart shown in FIG. 4 illustrates the overall dehumidifying performance of the HVAC system 2. Outside air is represented on the graph as condition curve 60. The first VAV system (the fresh air stream) has a condition curve 62 having an off-coil temperature and humidity plotted at point 64 and on-coil conditions plotted at point 66. The second VAV system (the recycled air stream) has a condition curve 70 having an off-coil temperature and humidity plotted at point 74 and on-coil conditions plotted at point 76. The conditions in the room are plotted at point 85.

By de-coupling the ventilation and cooling functions, excellent energy-efficiency may be achieved. A change in the ventilation requirement will only modulate the fresh air fan 22 and will not change the coolant flow rate under normal operating characteristics, i.e., no unusual increase in humidity differences downstream of the first VAV system 6 of the heat exchanger 20. A change in zonal thermal loads, characterized by a modulation of the recycled air fan 24, will modulate the coolant flow rate in the coolant circuit 21. For instance, when the occupancy of the room 42 diminishes, the ventilation requirement also diminishes. The fresh air fan speed is modulated accordingly, but the flow rate in the coolant circuit 21 remains unchanged. The temperature in the room 42 will therefore decrease because the air being cooled is mainly recycled air. The temperature sensor 36 in the return air duct 46 detects this temperature change and modulates the dampers and fan speed accordingly. When temperature and humidity levels begin to rise above the acceptable limits, the CPU 54 uses the signal from the fresh air temperature sensor in order to control the flow rate in the coolant circuit 21.

Although variable-air-volume systems are preferred because they further reduce energy consumption, the single-coil twin-fan system may also use twin constant-air-volume (CAV) systems or a hybrid system comprising a VAV system and a CAV system. If the hybrid system were to be properly implemented, the best mode of operation would be to use a CAV system to drive the air stream whose load characteristics are fairly constant and a VAV system to drive the air stream who load characteristics follow a fluctuating pattern. This provides for maximum flexibility in design and also maximizes energy-saving potential during operation.

The superior performance of the HVAC system of the present invention was validated by various experiments that were conducted in the Indoor Air Quality (IAQ) Chamber of the Department of Building at the National University of Singapore. The seven experiments presented in Table 1 below represent different points of operation of a variable-air-volume fan in a steady-state condition.

TABLE 1

Simulated experimental conditions in two chambers (Room 1 and Room 2) and simulated fan operating characteristics

| Experiment | Steady state period | Fresh air (F/A) fan | Recycled air (R/A) fan | Thermal load Room 1 | Thermal load Room 2 | Ventilation load Room 1 | Ventilation load Room 2 |
|---|---|---|---|---|---|---|---|
| 1 | 11:40 am–12:15 p.m. | 30% | 30% | Base | Base | Base | Base |
| 2a | 12:15–12:35 p.m. | 30% | 30% | Base | Base | High | Base |
| 2b | 1:00–1:20 p.m. | 100% | 30% | Base | Base | High | Base |
| 3a | 2:00–2:15 p.m. | 30% | 30% | High | Base | Base | Base |
| 3b | 3:15–3:40 p.m. | 30% | 100% | High | Base | Base | Base |
| 4a | 3:15–3:40 p.m. | 30% | 30% | Base | Base | High | Base |
| 4b | 3:40–4:10 p.m. | 100% | 30% | Base | Base | High | Base |

Tabulated above in Table 1 are various experiments that were run with thermal and ventilation loads that are characterized as either base or high. Base loads correspond to vacant or nearly vacant conditions, for which only minimal cooling and ventilation are required. Typically, base loads require fans to be run at 30% of their maximum speed. High ventilation loads are simulated by having eight occupants in Room 1 and high thermal loads are simulated by additional heat-emitting lights in Room 1. For the purposes of the performance validation tests, a single-coil twin-fan system was designed and fabricated having the characteristics and geometry presented in Table 2 below.

TABLE 2

Coil configuration and physical geometry

| Coil Characteristic | Fresh air Compartment | Recycled air compartment |
|---|---|---|
| Height (mm) | 330 | 330 |
| Width (mm) | 305 | 305 |
| Face area (m$^2$) | 0.1 | 0.1 |
| Face velocity at 100% flow (m/s) | 1.3 | 1.52 |
| Fin density (fpi) | 10 | 10 |
| Number of rows | 6 | 6 |

Even though the single-coil twin-fan system uses a single coil, the heat transfer characteristics of the portion of the coil in the fresh air stream need not be identical to the heat transfer characteristics of the portion of the coil in the recycled air stream. For example, the portion of the coil in the fresh air stream may have a different effective total surface area than the portion of the coil in the recycled air stream. Alternatively, the portion of the coil in the fresh air stream could have a smaller fin density than the portion of the coil in the recycled air stream. (A smaller fin density is better for dehumidification whereas a larger fin density is better for sensible cooling.) The difference in the effective surface areas of the two portions of the single coil is a design criterion that should govern the overall dimensions of the single coil in relation to the total anticipated cooling capacity. It is thus possible to design such coils in modular sizes that are capable of addressing the varying combinations of sensible and latent cooling requirements that are typical of different climatic conditions as well as varying occupancy levels.

The psychrometric analysis of all the seven experiments performed is presented in Table 3 below.

TABLE 3

Psychrometric analysis

|  | Psychrometric Parameters | Exp 1 | Exp 2a | Exp 2b | Exp 3a | Exp 3b | Exp 4a | Exp 4b |
|---|---|---|---|---|---|---|---|---|
| Fresh Air (F/A) | F/A ON coil: DBT (° C.) | 28.5 | 27.5 | 27 | 28.2 | 28 | 28.3 | 28.4 |
|  | F/A ON coil: DPT (° C.) | 23.6 | 23.6 | 23.4 | 23.5 | 22.4 | 23 | 23.3 |
|  | F/A OFF coil: DBT (° C.) | 11.1 | 11.3 | 12 | 11.3 | 12.6 | 11.2 | 12 |
|  | F/A OFF coil: DPT (° C.) | 11.1 | 11.3 | 12 | 11.3 | 12.6 | 11.2 | 12 |
|  | F/A Enthalpy: Difference (kJ/kg) | 43.6 | 42.1 | 39.3 | 42.7 | 36.5 | 41.8 | 40.6 |
|  | F/A Air flow rate (lps) | 53.9 | 53.9 | 129.7 | 48.3 | 48.3 | 53.6 | 148.3 |
|  | F/A Capacity (kW) | 2.78 | 2.69 | 6.04 | 2.44 | 2.09 | 2.65 | 7.13 |
| Recycled Air (R/A) | R/A ON coil: DBT (° C.) | 24.3 | 24.4 | 23.8 | 24 | 24 | 24.3 | 24.1 |
|  | R/A ON coil: DPT (° C.) | 17.4 | 17.8 | 17.2 | 17.3 | 18.2 | 17.5 | 17.2 |
|  | R/A OFF coil: DBT (° C.) | 10.6 | 11.3 | 10.3 | 10.9 | 12.5 | 10.7 | 11.7 |
|  | R/A ON coil: DPT (° C.) | 10.6 | 11.3 | 10.3 | 10.9 | 12.5 | 10.7 | 11.7 |
|  | R/A Enthalpy: Difference (kJ/kg) | 25.2 | 24.7 | 25.3 | 24.6 | 22.4 | 25.4 | 22.5 |
|  | R/A Air flow rate (lps) | 75.8 | 75.8 | 77.2 | 74.4 | 152.2 | 65.8 | 53.1 |
|  | R/A Capacity (kW) | 2.26 | 2.22 | 2.31 | 2.71 | 4.04 | 1.98 | 1.41 |
| F/A + R/A capacity | Total capacity of single coil with twin fans (kW) | 5.04 | 4.91 | 8.35 | 4.61 | 6.13 | 4.63 | 8.54 |

Table 3 shows that the single-coil system is dynamically responsive to the varying thermal and ventilation loads. Experiments 2b and 4b show the steady-state operating conditions of the coil when high ventilation is required in Room 1. The on-coil conditions in the recycled air stream (designated "R/A ON coil" in Table 3) are representative of the environmental conditions in the two rooms. Room 1, which requires high ventilation, has a relative humidity of 67% and 65% in Experiment 2b and Experiment 4b, respectively. The "off-coil" temperature of the recycled air is used in Experiment 2b and that of the fresh air is used in Experiment 4b. It is logical to use the fresh air "off-coil" temperature to control the chilled water flow rate through the coil in situations of high ventilation loads, as would be typical in the tropics.

A comparison of Experiment 3a and Experiment 3b shows that high thermal loads in Room 1 can be addressed with a high-volume air stream of recycled air which results in room humidity levels around 70% relative humidity. The occupancy in Room 1 and Room 2 is at the base level. The humidity level in Experiment 3b is achieved through chilled water modulation based on the recycled air "off-coil" temperature. The humidity can also be controlled based on the fresh air "off-coil" temperature. Based on these experimental results, the following control strategy is proposed. Chilled water modulation should be achieved by fresh air stream "off-coil" temperature feedback in climatic conditions requiring high ventilation. In contrast, chilled water modulation should be achieved by recycled air stream "off-coil" temperature feedback in climatic conditions with high thermal loads. It is also possible to switch from one control strategy to another, with ventilation predominating. As the chilled water modulation is achieved by either of the two "off-coil" temperatures, the chilled water flow rate through the compartment of the coil whose "off-coil" temperature is not in use could be used to alter the psychrometric performance of the system. For example, if the recycled air stream's "off-coil" temperature is used to control the chilled water flow rate, the air conditions of the fresh air stream could be dynamically varied. However, it is the mixture of the fresh air and the recycled air in the mixing box that determines the space conditions. An inherent buffer is built into the design of this coil. In these experiments, a buffer of 2. degree. C. (between 10. degree. C. and 12. degree. C.) on the saturation line is observed for the supply air temperatures.

Table 3 shows the energy-efficiency of the single-coil twin-fan system (SCTF). Energy is conserved because the fresh air fan and the recycled air fan are controlled independently to optimize their respective airflow requirements based on the individual, localized demand for ventilation or cooling. The coil is thus not required to provide more cooling than is necessary as operating conditions change. For example, in Experiment 4b, the total amount of fresh and recycled air used is 725 cubic meters per hour (m.sup.3/h). The fresh air fan operated at 100% of its maximum speed whereas the recycled air fan only operated at 30% of its maximum speed. If similar room conditions were to be achieved using a prior art VAV system, the fan would have to operate at 65% of its maximum speed to provide the same amount of total airflow to the room. In other words, Experiment 4b could be seen as a 65% part-load condition. This would translate to an airflow rate of 1115 m.sup.3/h when the conventional VAV fan operates at 100% speed. By simple proportionality, the fresh air to be provided at 100% fan speed ought to be about 820 m.sup.3/h if the amount of fresh air at the part-load condition of 65% is to be equal to what is being provided by the SCTF system (534 m.sup.3/h). This implies that at 100% output, the additional energy consumed by a conventional, prior art coil in a conventional VAV system is equivalent to the additional amount of fresh air provided at 100% output, which in this case is about 53%. By contrast, in the case of an SCTF system, the total amount of airflow at 100% output is 1115 m.sup.3/h. This breaks down into a fresh airflow rate of 534 m.sup.3/h and a recycled airflow rate of 581 m.sup.3/h.

Based on the foregoing psychrometric analysis, the SCTF system of the present invention is estimated to be approximately 15% more energy efficient than prior art VAV systems that are currently in use. This estimate, however, does not even include the energy savings attendant in reduced fan use. Moreover, the SCTF system does not need to have a second water pump or a second chilled water loop. This also results in further energy savings.

As noted, the HVAC system 2, uses either the off-coil temperature of the fresh air stream, or the off-coil temperature of the recycled air stream in order to control circulation of the fluid in fluid circuit 21 and air flow by way of damper 31, 33 and fan speed.

At the same time, however, it may be desirable to control heating and/or cooling of recycled and fresh air at different rates. For example, an HVAC system may be designed with different maximum cooling capacities for both fresh and recycled air. Alternatively, it may be desirable to have greater sensitivity in control of the fresh or recycled air or both. For example, changes in occupancy of the space being supplied with air may have a greater effect on the cooling of both recycled air and fresh air. However, non-occupancy related changes (eg. Weather conditions) will affect the recycled air more than the fresh air.

Figure 5:
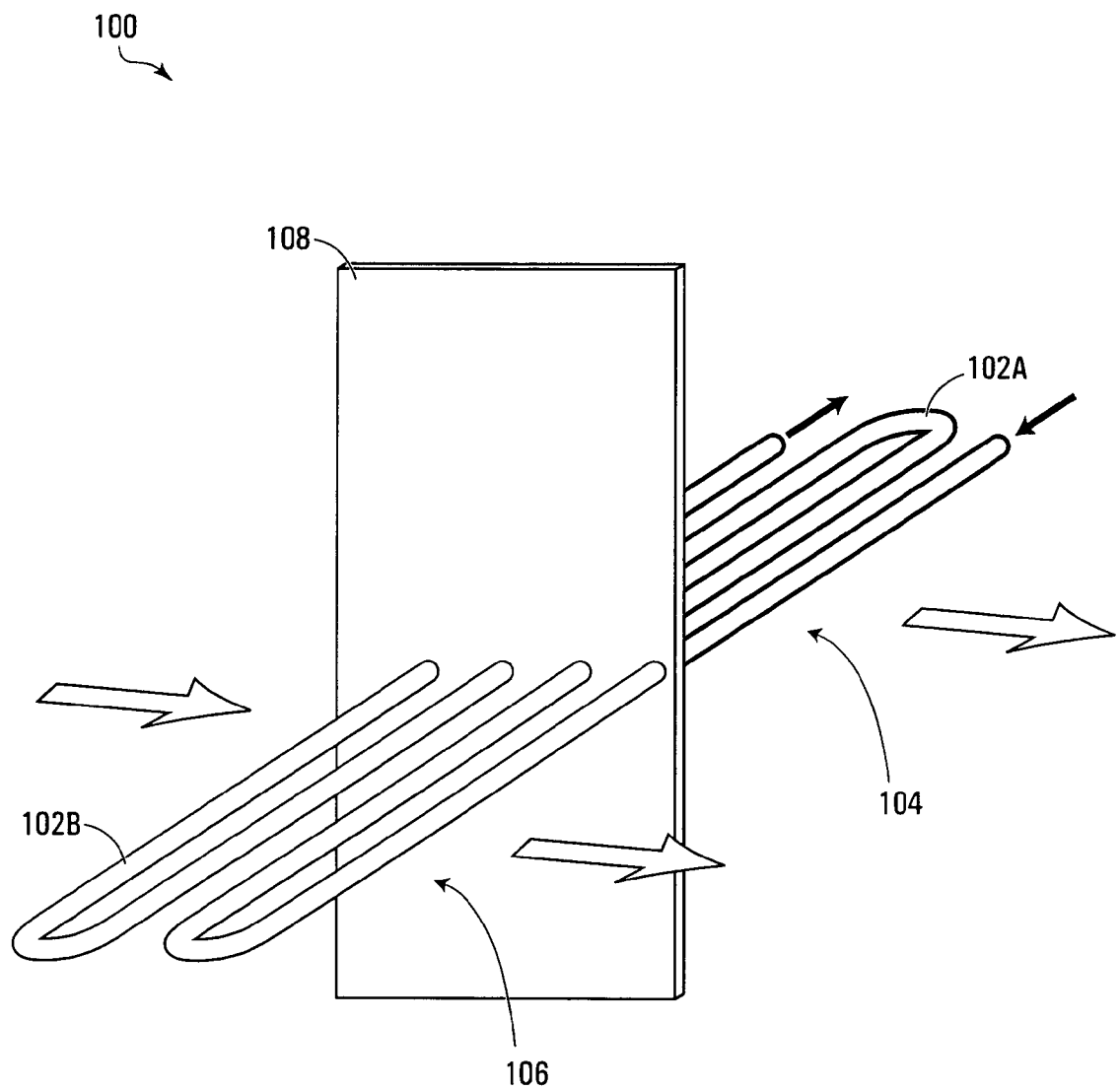
FIG. 5 is a partial perspective view schematically illustrating an alternative heat-exchanging arrangement for use in the system of FIG. 1.

FIG. 5 accordingly schematically illustrates an exemplary asymmetrical heat exchanger arrangement 100. Arrangement 100 includes a heat exchanger 102 in the form of a coil that may be used in the HVAC system 2 of FIG. 1, in place of coil 20. The asymmetrical arrangement 100 allows for the differential cooling or differential cooling rates of fresh and recycled air in VAV systems 6 and 8.

As illustrated, VAV systems 6 and 8 each include a compartment, schematically illustrated as compartment 104 and 106. The heat exchanger 102 defines an internal fluid path for a heat exchange fluid and is shared between the two compartments 104 and 106. More specifically, heat exchanger 102 has two coil portions 102A and 102B respectively disposed in the two compartments 104 and 106. In order to achieve differential cooling in the two compartments, the surface area of coil portion 102A is different from the surface area of coil portion 102B. In the depicted embodiment, a single heat exchanger 102 is shared: the fluid path of the coil forming heat exchanger 102 crosses between the two compartments 104 and 106 multiple timesOptionally, coil portion 102B of heat exchanger 102 may include a lesser number of straight tubing sections than that of coil portion 102A. Thus, the heat transfer capacity of coil portion 102B is smaller than that of coil portion 102A, even though the same heat exchange fluid flows back and forth between the two portions. As such, this arrangement may be used in applications that require lesser cooling in compartment 106 (fresh air) than what is required in the compartment 104 (recycled air).

As can be appreciated, by selecting the fraction of heat exchanger 102 disposed in each compartment 104, 106, the heat exchange capacity provided in the corresponding compartment 104 or 106 can be individually adjusted.

Of course, it is also possible to configure a portion of heat exchanger 102 to adjust its heat exchange capacity in alternative manners. For example, in addition to adjusting the total length of the fluid path or the total area of exposed heat exchange surface, the heat transfer efficiency of an exposed surface of the each tube portion 102A and 102B may also be controlled. Alterable features include the thickness of the tube portions 102A and 102B, the material forming the tube portions 102A, 102B surface coatings and the like. In particular, heat transfer fins may be formed or mounted on one of the portions 102A and 102B to increase heat transfer capacity. As can be appreciated, the heat transfer fins and a bare heat transfer tube may have different heat transfer efficiencies. The total heat transfer capacity of compartment 104 or 106 may be adjusted by increasing or reducing the area of heat transfer surfaces of the fins, the area of heat transfer surfaces of the tube, or the total area of heat transfer surfaces of both the fins and the tube in the compartment.

For example, the proportion of the bare tube surface area to the fin surface area (fin density) in 102A can be different from the fin density in 102B. As can be appreciated, a small fin density can provide good latent cooling and enhance dehumidification, which may be desirable for the fresh air stream, while a large fin density would provide good sensible cooling, which is good for recycled air. Thus, by adjusting fin densities in the two coil portions independently, desirable heat transfer control can be achieved in each one of the two compartments even though the two compartments share a single cooling coil. For instance, the densities can be so chosen that one compartment provides good sensible cooling and the other compartment provides good latent cooling.

Other features of the heat exchanger 102 that can be altered to affect the overall heat transfer capacity of the tube or a portion of it may also be adjusted in manners known to persons skilled in the art.

As will now be appreciated, using arrangement 100, HVAC system 2 (or another system like it) may be modified to provide differential cooling and cooling rates for two streams of air.

Additionally, it may be desirable to separately and dynamically control temperature and humidity of fresh and recycled air in a ventilation and air-conditioning (VAC) system. This may, for example conserve energy since the recycled air may need less conditioning than the fresh air. It may also be desirable to have more flexible control over the overall performance of the HVAC system. However, since only a single cooling fluid is used, and since off-coil humidity is highly dependent on the temperature of the fluid in the coil, it can be difficult to separately control the ventilation and air-conditioning functions by only regulating the air flow rates in the two compartments and the fluid temperature (such as by regulating the fluid flow rate).

Figure 6A:
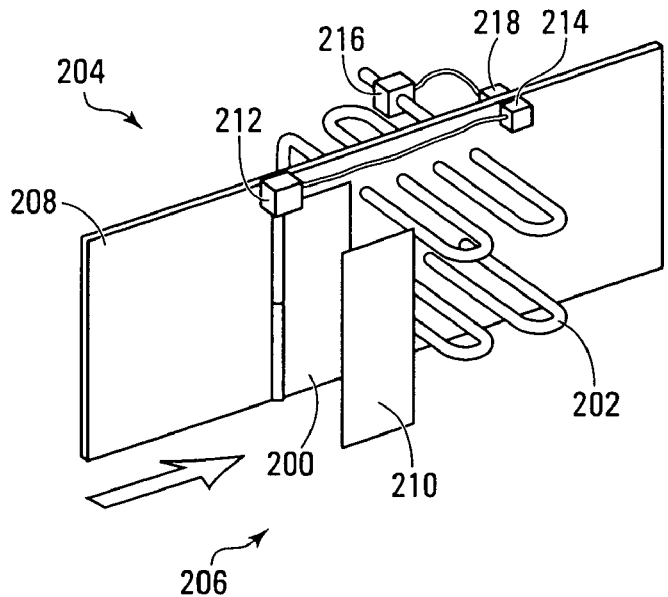
FIG. 6A–6C are partial perspective views schematically illustrating a simple face damper in different positions for use in the system of FIG. 1.
Figure 6B:
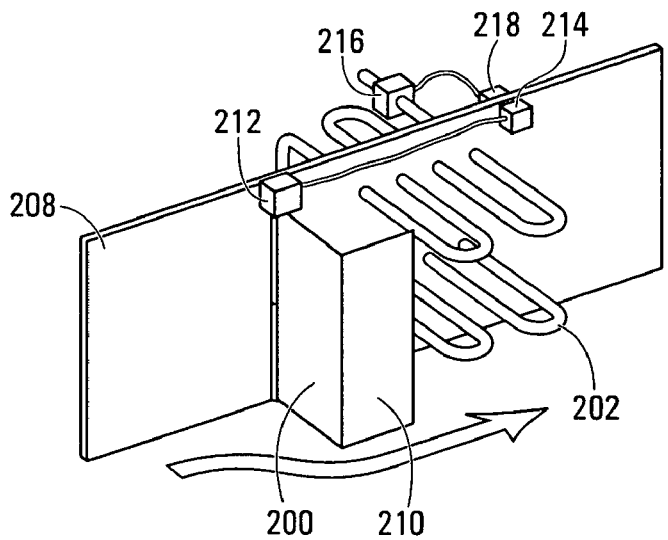
Figure 6C:
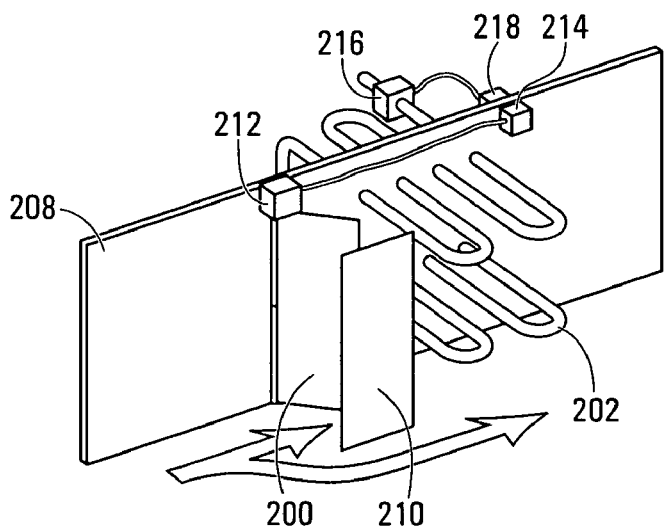

FIGS. 6A to 6C accordingly schematically illustrate another exemplary embodiment of a heat exchanger arrangement including a heat exchanger 202 that may be used in place of the cooling coil 20 in the HVAC 2 of FIG. 1. Again, single heat exchanger 202 is shared between two heat exchange compartments 204 and 206, which are separated by a barrier wall 208. Heat exchanger 202 is in the form of a coil. Heat exchange fluid in the coil passes between compartment 204 and 206 several times, through wall 208. The arrangement of FIGS. 6A–6C however, allows the effective heat exchange surface areas within the two cooling chambers 204, 206 on either side of wall 208 to be varied during operation.

To this end, a simple face damper 200 is mounted upstream of a coil 202 on one side of wall 208. In the depicted embodiment a single damper is provided in compartment 206. However, multiple dampers in compartments 206 and 208 could be provided.

As illustrated, damper blade 200 is pivotally mounted between the barrier wall 208 and a side wall 210 within compartment 206. Damper blade 200 is moveable between a fully open and closed position. In its fully open position, air can flow between walls 208 and 210 and reach coil 202, as illustrated in FIG. 6A. Damper blade 200 also has a closed position in which no air can flow between the walls 208 and 210, as illustrated in FIG. 6B. When damper blade 200 is in its closed position, air flow within compartment 206, by-passes heat exchanger 202 entirely. As illustrated in FIG. 6C, damper blade 200 may assume an intermediate, partially open position in which a portion of the air in compartment flows between the walls 208 and 210 over heat exchanger 202, while the remainder of the air flow within compartment 206 by-passes heat exchanger 202.

The damper blade 200 may be actuated by a motor 212 controlled by CPU 54 (FIG. 1). A sensor 214 placed downstream of coil 202 in compartment 206 (as shown) or in the target zone that is to be controlled (not shown), may be used in addition to, or instead of, other sensors to provide a signal to CPU 54 that may be used to control the position of blade 200 between its closed and open position. Sensor 214 may sense temperature or humidity value. Further, the fluid flow rate in coil 202 may be regulated by a valve 216 based on a signal sensed at a sensor 218 located downstream of the heat exchanger 202 in compartment 204. Damper blade 200 operates independent of the fluid flow rate in the coil to result in a simultaneous control of the off coil temperature in compartment 206.

Figure 7A:
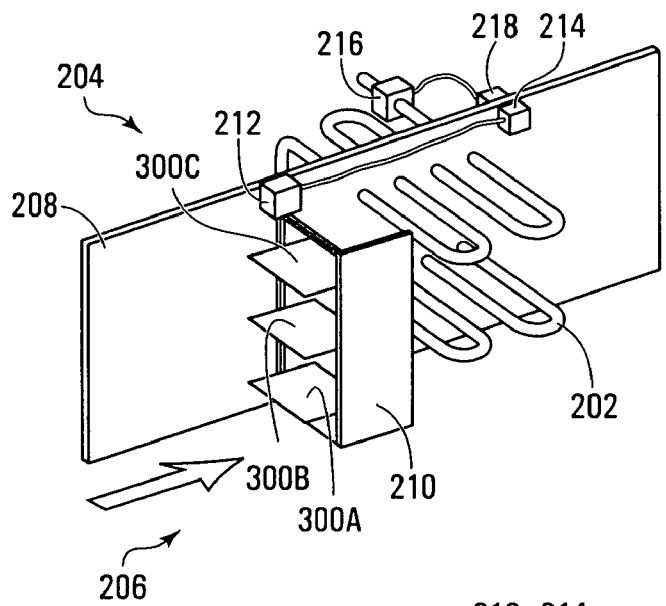
FIG. 7A–7C are partial perspective views schematically illustrating a louvered damper in different positions for use in the system of FIG. 1.
Figure 7B:
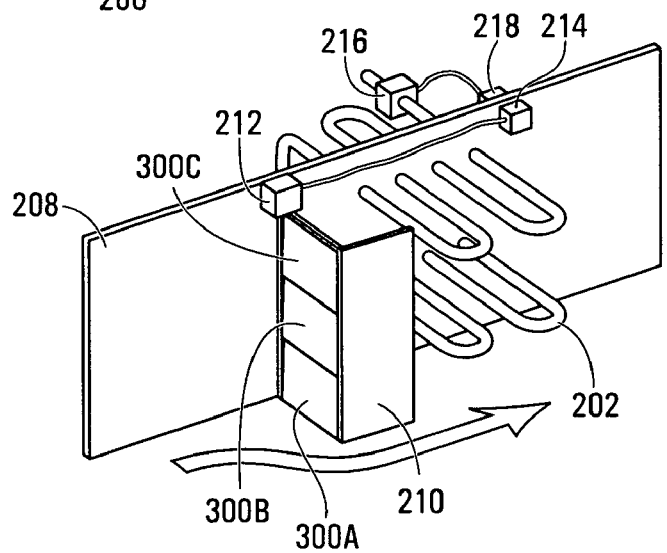
Figure 7C:
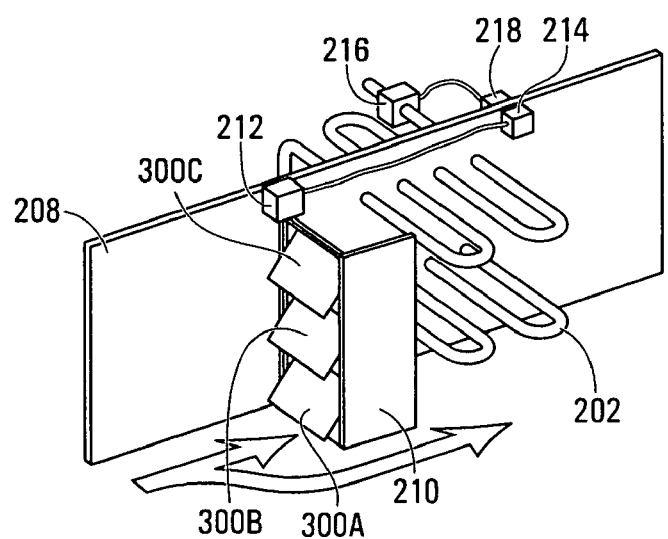

Alternatively, a louvered face damper 302 may be used in place of damper blade 200 as illustrated in FIGS. 7A to 7C. Damper 302 includes a plurality of louvers 300A, 300B and 300C, allowing for finer control of the air flow through damper 302, as the louvers are moved from their open position (FIG. 7A) to their closed position (FIG. 7B) thereby providing improved control.

As will be appreciated, many variations on the depicted dampers are possible. For example, the damper blade or blades can pivot either horizontally or vertically. Instead of pivotally mounted, a damper blade may be slidably mounted so that the damper blade can slide between fully open and closed positions. As can be appreciated, a bypass damper may be used in combination with the face damper. Further, a directional damper having a damper blade that may pivot to direct the air flow either towards or away from the coil may be used.

In operation, the overall air flow rate and the off-coil temperature in the compartment 206 can be controlled independent of the heat exchange fluid flow rate. For example, the compartment 206 may be used for return air and the compartment 204 for fresh air. The off-coil temperature of the return air can be controlled by positioning the damper blade 200 or blades 300 in the return air compartment, independent of the air flow rate in that compartment. Further, the off-coil temperature of the fresh air can be controlled by regulating the fluid flow rate in heat exchanger 202.

As should now be appreciated, an HVAC system such as HVAC system 2 can be adapted for use in variable situations with no or minimal modification, using the heat exchange arrangement FIGS. 6A–6C or FIGS. 7A–7C. Improved control over an HVAC system embodying aspects of the invention can be achieved by individually configuring the two compartments to obtain a desired heat exchange capacity in each of the compartments. For example, the heat transfer capacities of the coil in the two compartments may initially be selected: the heat exchanger (102 or 202) may be disposed asymmetrically in the two compartments so that the heat exchange surfaces exposed in the two compartments have unequal total areas.

Thereafter, the off-coil temperatures of the fresh and return air streams can be independently and simultaneously controlled. The fresh air off-coil temperature is controlled by modulating the fluid flow rate while the return air off-coil temperature by using damper 200 or 300A–300C.

It is expected that such a control strategy will also eliminate the buffer present in the previous embodiments.

The above description of the exemplary embodiments should not be interpreted in a limiting manner since other variations, modifications and refinements are possible without departing from the teachings. Such variations, modifications and refinements are intended to be included in the scope of the invention which is defined in the claims.

What is claimed is:

1. A ventilation and air-conditioning system for energy-efficient conditioning of independent fresh and recycled air streams, said system comprising:
   a) a first intake for drawing in a volume of fresh air;
   b) a second intake for drawing in a volume of recycled air;
   c) a single-coil heat exchanger in direct contact with the volume of fresh air in a first region and in direct contact with the volume of recycled air in a second region, thereby producing a supply of conditioned fresh air and a supply of conditioned recycled air, wherein said first region and said second region are separated by a barrier and wherein said single-coil heat exchanger defines a fluid path transporting heat exchange fluid from said first region to said second region through said barrier, and transporting said heat exchange fluid back through said barrier from said second region to said first region;
   d) a first fan for moving said supply of conditioned fresh air downstream in a first duct;
   e) a second fan for moving said supply of conditioned recycled air downstream in a second duct;
   f) a mixing box connected downstream of said first duct and said second duct, said mixing box being an enclosure in which said supply of conditioned fresh air and said supply of conditioned recycled air may mix prior to being ventilated into a room or zone; and g) a control system for sensing a zonal temperature and a zonal ventilation requirement and for regulating said supply of conditioned fresh air in accordance with said zonal ventilation requirement and for regulating said supply of conditioned recycled air in accordance with said zonal temperature.

2. A ventilation and air-conditioning system as defined in claim 1 wherein said mixing box comprises a fresh air compartment connected to said first duct and a recycled air compartment connected to said second duct, said fresh air compartment comprising a fresh air damper for admitting conditioned fresh air into a mixing chamber within said mixing box, and said recycled air duct comprising a recycled air damper for admitting conditioned recycled air into the mixing chamber within said mixing box.

3. A ventilation and air-conditioning system as defined in claim 2 further comprising a return air duct connected to said second intake, said return air duct comprising a carbon dioxide sensor for sensing said zonal ventilation requirement and a temperature sensor for sensing said zonal temperature, said sensors providing signals to said control system.

4. A ventilation and air-conditioning system as defined in claim 3 wherein said single-coil heat exchanger has coolant flowing in a counter-flow arrangement.

5. A ventilation and air-conditioning system as defined in claim 4 further comprising a fresh air filter connected to said first intake and a recycled air filter connected to said second intake.

6. A ventilation and air-conditioning system as defined in claim 1 wherein said first fan is a variable-air-volume fan and said second fan is a variable-air-volume fan.

7. A ventilation and air-conditioning system as defined in claim 1 wherein said first fan is a constant-air-volume fan and said second fan is a constant-air-volume fan.

8. A ventilation and air-conditioning system as defined in claim 1 wherein said first fan is a constant-air-volume fan and said second fan is a variable-air-volume fan.

9. A ventilation and air-conditioning system as defined in claim 5 wherein said first fan is a variable-air-volume fan and said second fan is a variable-air-volume fan.

10. A ventilation and air-conditioning system as defined in claim 9 wherein said control system comprises a central processing unit for processing signals received from said temperature sensor and said carbon dioxide sensor whereby the central processing unit controls said first fan and said second fan.

11. A ventilation and air-conditioning system as defined in claim 10 wherein said central processing unit further controls the rate of coolant flow in said single-coil heat exchanger.

12. A ventilation and air-conditioning system as defined in claim 11 wherein said central processing unit further controls an exhaust damper for exhausting an excess volume of recycled air.

13. An air-handling unit for use in a heating, ventilation and air-conditioning system, said air-handling unit comprising a first conditioning system for conditioning and moving a volume of fresh air through a first duct and a second conditioning system for conditioning and moving a volume of recycled air through a second duct, a barrier at least partially separating said first conditioning system and said second conditioning system; a heat-exchanging coil in direct contact with said volume of fresh air and said volume of recycled air passing, said heat-exchanging coil passing through said barrier at least twice to pass heat exchange fluid from said first conditioning system and said second conditioning system, and back from said second conditioning system to said first conditioning system to condition both said volume of fresh air and said volume of recycled air.

14. An air-handling unit as defined in claim 13 wherein said first conditioning system is a first variable-air-volume system and said second conditioning system is a second variable-air-volume system.

15. An air-handling unit as defined in claim 14 wherein said first variable-air-volume system comprises a first fan controllable by a control system based on a feedback signal from a carbon dioxide sensor and said second variable-air-volume system comprises a second fan controllable by said control system based on a feedback signal from a temperature sensor.

16. An air-handling unit as defined in claim 15 wherein said first variable-air-volume system further comprises a fresh air filter and said second variable-air-volume system further comprises a recycled air filter.

17. An air-handling unit as defined in claim 16 wherein said coil is disposed in a counter-flow arrangement.

18. An air-handling unit as defined in claim 17 wherein said coil contains a coolant whose rate of flow is regulated by said control system based on the feedback signal from a temperature sensor located in the air-handling unit.

19. An air-handling unit as defined in claim 13 wherein said first conditioning system is a first constant-air-volume system and said second conditioning system is a second constant-air-volume system.

20. An air-handling unit as defined in claim 13 wherein said first conditioning system is a constant-air-volume system and said second conditioning system is a variable-air-volume system.

21. The air-handling unit of claim 13 wherein said coil has first and second portions, said first portion for exchanging heat with air in said first duct, said second portion for exchanging heat with air in said second duct, said coil having an internal fluid path for a heat exchange fluid, said fluid path crossing between said first and second conditioning systems.

22. The air-handling unit of claim 21, wherein said first portion and said second portion have different overall heat transfer coefficients.

23. The air-handling unit of claim 22, wherein said first and second portions have different lengths.

24. The air-handling unit of claim 22, wherein said first and second portions have different total area of external surfaces.

25. The air-handling unit of claim 21, wherein said coil comprises a plurality of fins on one of said first and second portions.

26. The air-handling unit of claim 21, wherein said coil comprises first fins disposed on said first portion and second fins disposed on said second portion, said first and second fins having different total heat transfer capacities.

27. The air-handling unit of claim 21 wherein the effective heat transfer capacities in said first and second condition systems are separately and simultaneously regulated.

28. The air-handling unit of claim 27 wherein said second conditioning system comprises a damper mounted in said second duct upstream of said second portion of said coil, said damper having a damper blade movable between a plurality of positions for selectively restricting air flow over said second portion; and said second conditioning system further comprises a controller for positioning said damper blade based on a signal sensed in said second conditioning system so as to regulate the effective heat exchange capacity in said second conditioning system.

29. The air-handling unit of claim 28 wherein said signal is indicative of an off-coil temperature of said volume of recycled air.

30. The air-handling unit of claim 29 further comprising a fluid controller for regulating a fluid flow rate in said fluid path based on a sensed signal indicative of an off-coil temperature of said volume of fresh air.

31. The air-handling unit of claim 30 wherein said damper comprises frame walls defining an opening, said damper blade pivotally mounted adjacent said opening, said damper blade pivotally movable between a fully closed position, in which said damper blade fully covers said opening to block airflow through said damper, and a fully open position, in which said opening allows maximum airflow through said damper.

32. The system of claim 31 wherein said damper comprises a plurality of pivotally mounted damper blades extending between a pair of opposite ones of said frame walls.

33. A ventilation and air-conditioning system comprising:
- a housing having first and second compartments in parallel arrangement, each one of said first and second compartments having an inlet and an outlet allowing a air to flow therethrough;
- a heat exchanger comprising a heat-exchange coil shared between said first and second compartments, said heat-exchanger coil having first and second portions, said first portion in contact with air in said first compartment, said second portion in contact with air in said second compartment, said heat-exchanger coil having an internal fluid path for a heat exchange fluid, said fluid path repeatedly crossing between said first and second portions.

34. The system of claim 33, wherein said first portion and said second portion have different overall heat transfer coefficients.

35. The system of claim 33 wherein said heat exchanger comprises a coil, and wherein said first portion and said second portion are portions of said coil.

36. The system of claim 35, wherein said second portion of said coil has a length greater than said first portion of said coil.

37. The system of claim 35, wherein said second portion has a total area of external surface greater than said first portion.

38. The system of claim 35, wherein said heat exchanger comprises a plurality of fins disposed on one of said first and second portions.

39. The system of claim 35, wherein said heat exchanger comprises first fins disposed on said first portion and second fins disposed on said second portion, said first and second fins having different total heat transfer capacities.

40. The system of claim 33 comprising a controller for sensing a zonal signal and for separately regulating the effective heat exchange capacities of said first and second compartments in accordance with said zonal signal.

41. The ventilation and air-conditioning system of claim 40 comprising a damper mounted in said first compartment upstream of said first portion of said heat exchanger, said damper having a damper blade movable between a plurality of positions for selectively restricting air flow over said first portion, said control system comprising a damper controller for automatically positioning said damper blade based on a signal sensed in said system so as to regulate the effective heat exchange capacity of said first compartment.

42. The ventilation and air-conditioning system of claim 41 wherein said signal is indicative of an off-coil temperature of a stream of air in said first compartment.

43. The ventilation and air-conditioning system of claim 42 wherein said control system comprises a fluid controller for regulating a fluid flow rate in said fluid path based on a sensed signal indicative of an off-coil temperature of a stream of air in said second compartment.

44. The ventilation and air-conditioning system of claim 40 wherein said damper comprises frame walls defining an opening, said damper blade pivotally mounted adjacent said opening, said damper blade pivotally movable between a fully closed position, in which said damper blade fully covers said opening to block airflow through said damper, and a fully open position, in which said opening allows maximum airflow through said damper.

45. The ventilation and air-conditioning system of claim 44 wherein said damper comprises a plurality of pivotally mounted damper blades extending between a pair of opposite ones of said frame walls.

46. An air-handling unit as defined in claim 13, wherein said barrier is thermally insulated.

47. A ventilation and air-conditioning system as defined in claim 1, wherein said barrier is thermally insulated.

* * * * *

UNITED STATES PATENT AND TRADEMARK OFFICE
CERTIFICATE OF CORRECTION

| | | |
|---|---|---|
| PATENT NO. | : 7,059,400 B2 | |
| APPLICATION NO. | : 10/860391 | |
| DATED | : June 13, 2006 | |
| INVENTOR(S) | : Chandra Sekhar et al. | |

It is certified that error appears in the above-identified patent and that said Letters Patent is hereby corrected as shown below:

Title Page, Item (73) Assignee: should read "National University of Signapore" should read --National University of Singapore--

Claim 13, line 12, "system and said" should read --system to said--

Claim 33, line 8, "exchanger" should read --exchange--

Claim 33, line 11, "exchanger" should read --exchange--

Signed and Sealed this

Third Day of April, 2007

JON W. DUDAS
*Director of the United States Patent and Trademark Office*